United States Patent
Xu

(10) Patent No.: US 12,185,001 B1
(45) Date of Patent: Dec. 31, 2024

(54) METHOD AND SYSTEM FOR OPTIMIZING SAMPLING OF SHORT-WAVE INFRARED DETECTOR

(71) Applicant: Yunnan Observatory, Chinese Academy of Sciences, Kunming (CN)

(72) Inventor: Fangyu Xu, Kunming (CN)

(73) Assignee: Yunnan Observatory, Chinese Academy of Sciences, Kunming (CN)

(*) Notice: Subject to any disclaimer, the term of this patent is extended or adjusted under 35 U.S.C. 154(b) by 0 days.

(21) Appl. No.: 18/783,459

(22) Filed: Jul. 25, 2024

(30) Foreign Application Priority Data

Mar. 22, 2024 (CN) .......................... 202410329758.3

(51) Int. Cl.
| | |
|---|---|
| *H04N 25/616* | (2023.01) |
| *G01J 5/08* | (2022.01) |
| *H04N 25/20* | (2023.01) |
| *H04N 25/40* | (2023.01) |
| *G01J 5/00* | (2022.01) |

(52) U.S. Cl.
CPC .......... *H04N 25/616* (2023.01); *G01J 5/0859* (2013.01); *H04N 25/20* (2023.01); *H04N 25/40* (2023.01); *G01J 2005/0077* (2013.01)

(58) Field of Classification Search
CPC ...... H04N 25/616; H04N 25/20; H04N 25/40; G01J 5/0859; G01J 2005/0077
See application file for complete search history.

(56) References Cited

U.S. PATENT DOCUMENTS

| | | | |
|---|---|---|---|
| 2011/0309236 A1* | 12/2011 | Tian ................. | H01L 27/14638 257/E31.097 |
| 2012/0154597 A1 | 6/2012 | Wilson et al. | |

(Continued)

FOREIGN PATENT DOCUMENTS

| | | |
|---|---|---|
| CN | 108665423 A | 10/2018 |
| CN | 112284535 A | 1/2021 |

(Continued)

OTHER PUBLICATIONS

Chen Xi, et al., An Integrator Without Drift Based on Chopper and Digital Signal Processing, System Engineerign and Electronics, 2001, pp. 18-20, vol. 23 No. 7.

*Primary Examiner* — Jae N Noh
(74) *Attorney, Agent, or Firm* — Bayramoglu Law Offices LLC

(57) ABSTRACT

A method and a system for optimizing sampling of short-wave infrared detector relate to the technical field of image processing. The method includes: enabling the multiple integrating readout function of the short-wave infrared detector; performing n integrating imaging on a target region by using a multiple integrating readout camera, subtracting a first frame image from all images to obtain n images within one integrating period; determining the correction coefficient sequence based on the integrating capacitor, the sampling capacitor, and the sampling sequence; carrying out multiplication correction respectively on the n images in sequence according to a one-to-one correspondence mode of the sampling sequence of the n images and the correction coefficient sequence order of the n images to obtain n corrected images; and performing line fitting on the corrected n images to obtain the algorithm output values for each pixel of the processed images.

7 Claims, 4 Drawing Sheets

(56) References Cited

U.S. PATENT DOCUMENTS

2013/0076910 A1* 3/2013 Scott .................. H04N 25/42
                                                348/E5.09
2017/0237268 A1   8/2017 Brannick et al.

FOREIGN PATENT DOCUMENTS

| | | |
|---|---|---|
| CN | 112857587 A | 5/2021 |
| CN | 115900972 A | 4/2023 |
| CN | 116295864 A | 6/2023 |
| CN | 117309153 A | 12/2023 |
| EP | 3386180 A1 | 10/2018 |
| WO | 2004043062 A1 | 5/2004 |

* cited by examiner the multiple integrating readout function of the short-wave infrared detector is enabled

↓ n integrating imaging on a target region is performed by using a multiple integrating readout camera, the first frame image as offset is subtracted from all images to obtain n images within one integrating period

↓ the correction coefficient sequence is determined based on the integrating capacitor, the sampling capacitor, and the sampling sequence

↓ multiplication correction respectively on the n images in sequence is carryed out according to a one-to-one correspondence mode of the sampling sequence of the n images and the correction coefficient sequence order of the n images to obtain n corrected images

↓ the line fitting on the corrected n images is performed to obtain the algorithm output values for each pixel of the processed images as the image sampling results

FIG. 1

METHOD AND SYSTEM FOR OPTIMIZING SAMPLING OF SHORT-WAVE INFRARED DETECTOR

CROSS REFERENCE TO THE RELATED APPLICATIONS

This application is based upon and claims priority to Chinese Patent Application No. 202410329758.3, filed on Mar. 22, 2024, the entire contents of which are incorporated herein by reference.

TECHNICAL FIELD

The present disclosure relates to the technical field of image processing, in particular to a method and a system for optimizing sampling of short-wave infrared detector.

BACKGROUND

Short-wave infrared camera is an important terminal instrument for short-wave infrared astronomical observation. Due to the narrow bandwidth used for short-wave infrared astronomical observations or the low brightness of the target itself, the actual number of target photons captured by the infrared detector is very small, the obtained target signal is quite weak, and in order to improve the signal-to-noise ratio, the required exposure time is also longer.

With the successful development of multiple integrating readout infrared detector, the corresponding sampling readout algorithm has also been developed. Infrared detectors with multiple integrating readout function are often used in the scenario of ultra-long integrating time, in which the conventional correlated double sampling (CDS) method can not eliminate the readout noise well. Besides the CDS, Fuller sampling and ramp sampling are the most commonly used optimal sampling algorithms. Fuller sampling is carried out for multiple times after the reset is completed, and the same number of samples are carried out before the integrating is completed, and the average value of the difference between the previous and subsequent multiple sampling data as the result output. Slope sampling is to sample at equal intervals during the whole integrating period, and the slope is fitted by the least square method and output. Fuller sampling and ramp sampling do not take into account the impact of the actual sampling process on the integrating capacitor power, and output the nonlinear sampling results as linear results, which brings system errors to high-precision measurement, especially in the application scenarios of long integrating time.

Therefore, how to provide a method and a system for optimizing sampling of short-wave infrared detector, correct the influence of the actual sampling process on the integrating capacitor power, and improve the measurement accuracy of the target source under long integrating time is an urgent problem for those skilled in the art.

SUMMARY

In view of this, the present disclosure provides a method and a system for optimizing sampling of short-wave infrared detector, which mainly solve two main problems caused by the fact that the influence of the actual sampling process on the integrating capacitor power is not considered in the process of using a slope sampling algorithm of a multiple integrating readout infrared detector under long integrating time: first, the nonlinear problem of actual output, and second, the problem of the difference between the actual output and the ideal output increasing with the number of sampling times. All these will bring systematic errors to high-precision measurement. Therefore, the technical solutions adopted by the disclosure is as follows: according to the difference between an integrating capacitor and a sampling capacitor in slope sampling, a system error between a sampling result and an ideal condition, which is caused by the influence of an actual sampling process on the integrating capacitor power, is corrected in real time in an imaging circuit within an integrating period.

In order to achieve the above effects, the present disclosure adopts the following technical solutions: a method for optimizing sampling of short-wave infrared detector, which includes the following steps:

enabling the multiple integrating readout function of the short-wave infrared detector; setting the sampling times of multiple integrating readout to n after entering the normal imaging mode, and outputting n initial images before each reset. The sampling interval, that is, each integrating time, is &, and the subsequent parameters are counted from 1;

performing n integrating imaging on a target region by using a multiple integrating readout camera, subtracting a first frame image from all images to obtain n images within one integrating period;

determining the correction coefficient sequence based on the integrating capacitor, the sampling capacitor, and the sampling sequence; and carrying out multiplication correction respectively on the n images in sequence according to a one-to-one correspondence mode of the sampling sequence of the n images and the correction coefficient sequence order of the n images to obtain n corrected images.

Preferably, the method also includes performing line fitting on the corrected n images to obtain the algorithm output values for each pixel of the processed images as the image sampling results.

Preferably, the correction coefficient sequence is expressed as:

$$M=\{m_1, m_2, \ldots, m_n\};$$

$$m_i = \frac{i-1}{\sum_{j=2}^{i} \eta^j};$$

wherein, M is the correction coefficient sequence; $m_i$ is the correction coefficient corresponding to the ith frame image; z is the sampling sequence, $i \in (1, \ldots, n)$, $j \in (2, \ldots, i)$; n is the total number of sampling times; I is the charge retention rate of the integrating capacitor, $$\eta = \frac{C_1}{C_1 + C_2} (\eta < 1);$$

wherein, $C_1$ is the capacitance of the integrating capacitor and $C_2$ is the capacitance of the sampling capacitor.

Preferably, setting the power of the integrating capacitor after each sampling to $q_i$ to obtain the integrating capacitor power after each sampling is as:

$$q_0 = O$$

$$q_1 = \eta(Q_0 + O) = \eta Q_0 + \eta O$$

-continued $$q_2 = \eta(\eta(Q_0 + O) + Q_0) = \eta^2 Q_0 + \eta Q_0 + \eta^2 O$$

$$\vdots$$

$$q_n = (Q_{n-1} + Q_0)\eta = \sum_{i=1}^{n} \eta^i Q_0 + \eta^n O;$$

wherein, $q_n$ is the power after n times of sampling, i is the sampling sequence, $i \in (1, \ldots, n)$, O is the initial power of the capacitor, $Q_0$ is the integrating photoelectron increment in the sampling interval, and $\eta$ is the charge retention rate of the integrating capacitor.

Preferably, subtracting the integrating capacitor power $q_1$ after the first sampling from the integrating capacitor power q after the sampling to obtain the charge quantity of corresponding gray values of n images in one integrating period, including:

$$q_1 - q_1 = 0$$

$$q_2 - q_1 = \eta^2 Q_0 + \eta^2 O - \eta O$$

$$\vdots$$

$$q_n - q_1 = \sum_{i=1}^{n} \eta^i Q_0 + \eta^n O - \eta Q_0 - \eta O = \sum_{i=2}^{n} \eta^i Q_0 + \eta^n O - \eta O;$$

multiplying the charge quantity corresponding to the gray values of n images with the corresponding correction coefficient to obtain the charge quantity of n corrected images corresponding to the gray values:

$$P_i = (q_i - q_1) * m_i;$$

wherein, $P_i$ is the charge quantity corresponding to the gray values of the i-th frame image after correction, and $m_i$ is the correction coefficient corresponding to the i-th frame image.

In actual shooting, the image of n frames obtained by subtracting the first frame as offset is multiplied by the corresponding correction coefficient to realize the correction of the images.

Preferably, performing line fitting on the corrected n images to obtain the algorithm output values for each pixel of the processed images, which includes:
    taking the gray values of all the pixels in the r-th row and the c-th column in the n images as a group of data sequences;
    determining an algorithm output value corresponding to each pixel respectively according to the data sequence corresponding to each pixel position:

$$V(r, c) = \sum_{i=1}^{n} \frac{12 y_i(r, c)(i - (n+1)/2)}{n(n+1)};$$

wherein, n data in the data sequence corresponding to the pixel at the r-th row and the c-th column are numbered from 1 according to the sampling sequence. In the formula, V(r,c) is the algorithm output value corresponding to the pixel in the r-th row and the c-th column, $y_i(r,c)$ is the gray value corresponding to the data numbered i in the data sequence corresponding to the pixel in the r-th row and the c-th column, both r and c are integers, and r and c respectively are the row number and the column number of the pixel, n is the total number of images participating in the calculation, and i is the sampling order.

Preferably, a system for optimizing sampling of short-wave infrared detector, including:
    a short-wave infrared detector, configured to enable the multiple integrating readout function of the short-wave infrared detector;
    a multiple integrating readout camera, configured to perform n integrating imaging on a target region;
    an integrating imaging processing module, configured to subtract a first frame image from all images to obtain n images within one integrating period;
    a correction coefficient sequence determination module, configured to determine the correction coefficient sequence based on the integrating capacitor, the sampling capacitor, and the sampling sequence; and
    an image correction module, configured to carry out multiplication correction respectively on the n images in sequence according to a one-to-one correspondence mode of the sampling sequence of the n images and the correction coefficient sequence order of the n images to obtain n corrected images.

Preferably, the system also includes a result output module, configured to perform line fitting on the corrected n images to obtain the algorithm output values for each pixel of the processed images as the image sampling results.

According to the above technical solutions, it can been seen that compared with the prior art, the present disclosure discloses a method and a system for optimizing sampling of short-wave infrared detector, including: enabling the multiple integrating readout function of the short-wave infrared detector; performing n integrating imaging on a target region by using a multiple integrating readout camera, subtracting a first frame image from all images to obtain n images within one integrating period; determining the correction coefficient sequence based on the integrating capacitor, the sampling capacitor, and the sampling sequence; carrying out multiplication correction respectively on the n images in sequence according to a one-to-one correspondence mode of the sampling sequence of the n images and the correction coefficient sequence order of the n images to obtain n corrected images; and performing line fitting on the corrected n images to obtain the algorithm output values for each pixel of the processed images as the image sampling results. The present disclosure has the following beneficial effects:

(1) The present disclosure corrects the influence of the actual sampling process on the integrating capacitor power by introducing correction coefficients, reduces system errors, and improves the measurement accuracy of the target source under long integrating time.

(2) Assuming that the noise contained in each sampling value is independent of each other as $\sigma$, and the standard deviation of the correlated double sampling method is $\sigma_{CDS} = \sqrt{2}\sigma$, so the relationship between the slope sampling and the correlated double sampling method can be obtained as follows:

$$\sigma_V = \sqrt{\frac{6(n-1)}{n(n+1)}} \sigma_{CDS};$$

the readout noise can be effectively reduced with the increase of the sampling times.

(3) In the present disclosure, V(r,c) rath than the slope is selected as a final image in combination with actual astronomical observation, so that the physical mean of the gray value of the processed image is similar to that of an original image of a detector, and various existing image processing algorithm can be directly used.

BRIEF DESCRIPTION OF THE DRAWINGS

In order to more clearly illustrate the embodiments of the present disclosure or technical solutions in the related art, the accompanying drawings used in the embodiments or the related art will now be described briefly. It is obvious that the drawings in the following description are only the embodiment of the disclosure, and that those skilled in the art can obtain other drawings from these drawings without any creative efforts.

FIG. 1 is a schematic flow chart of a method for optimizing sampling of short-wave infrared detector according to an embodiment of the present disclosure.

DETAILED DESCRIPTION OF THE EMBODIMENTS

Figure 2:
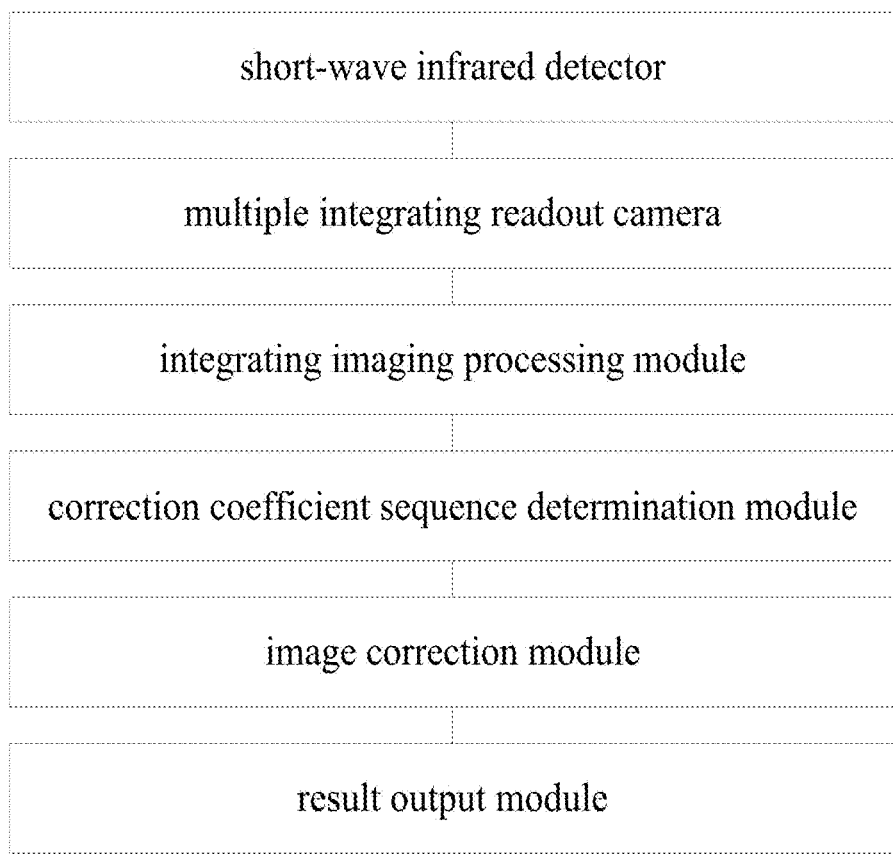
FIG. 2 is a schematic structural diagram of a system for optimizing sampling of short-wave infrared detector according to an embodiment of the present disclosure.

In the following, the technical solutions in the embodiments of the present disclosure will be clearly and completely described with reference to the drawings in the embodiments of the present disclosure. Obviously, the described embodiments are only a part of the embodiments of the present disclosure, but not all the embodiments thereof. Based on the embodiments of the present disclosure, all other embodiments obtained by those skilled in the art without any creative efforts shall fall within the scope of the present disclosure.

The present embodiment discloses a method and a system for optimizing sampling of short-wave infrared detector. Compared with a common sampling method for a general infrared detector such as correlated double sampling, the embodiment of the present disclosure can further reduce the read-out noise. Compared with a special sampling method for multiple integral readout of an infrared detector, such as standard slope sampling, the embodiment of the present disclosure further corrects the influence of the actual sampling process on the integrating capacitor power and improves the measurement accuracy under long integrating time.

The present embodiment discloses a method for optimizing sampling of short-wave infrared detector, as shown in the FIG. 1, including the following steps.

S1, the multiple integrating readout function of the short-wave infrared detector is enabled; the sampling times of multiple integrating readout to n are setted after entering the normal imaging mode, and n initial images are outputted before each reset. The sampling interval, that is, each integrating time, is δt, and the subsequent parameters are counted from 1.

S2, n integrating imaging on a target region is performed by using a multiple integrating readout camera, the first frame image as offset is subtracted from all images to obtain n images within one integrating period. The n images in one integration period are used for subsequent correction calculation, and the n initial image data output by the detector are received by the camera.

S3, the correction coefficient sequence is determined based on the integrating capacitor, the sampling capacitor, and the sampling sequence.

S4, multiplication correction respectively on the n images in sequence is carryed out according to a one-to-one correspondence mode of the sampling sequence of the n images and the correction coefficient sequence order of the n images to obtain n corrected images.

S5, the line fitting on the corrected n images is performed to obtain the algorithm output values for each pixel of the processed images as the image sampling results.

Specifically, the power of the integrating capacitor after each sampling is setted as $q_i$. Assuming $q_0=0$, the integrating capacitor power after each sampling is as:

$$q_0 = O$$
$$q_1 = \eta(Q_0 + O) = \eta Q_0 + \eta O$$
$$q_2 = \eta(\eta(Q_0 + O) + Q_0) = \eta^2 Q_0 + \eta Q_0 + \eta^2 O$$
$$\vdots$$
$$q_n(q_{n-1} + Q_0)\eta = \sum_{i=1}^{n} \eta^i Q_0 + \eta^n O$$

wherein, $q_n$ is the power after n times of sampling, i is the sampling sequence, $i \in (1, \ldots, n)$, O is the initial power of the capacitor, $Q_0$ is the integrating photoelectron increment in the sampling interval, and $\eta$ is the charge retention rate of the integrating capacitor.

$$\eta = \frac{c_1}{c_1 + c_2} (\eta < 1);$$

wherein, $C_1$ is the capacitance of the integrating capacitor and $C_2$ is the capacitance of the sampling capacitor.

The integrating capacitor power $q_1$ after the first sampling is subtracted from the integrating capacitor power $q_i$ after the sampling to obtain the charge quantity of corresponding gray values of n images in one integrating period, including:

$$q_1 - q_1 = 0$$
$$q_2 - q_1 = \eta^2 Q_0 + \eta^2 O - \eta O$$
$$\vdots$$
$$q_n - q_1 = \sum_{i=1}^{n} \eta^i Q_0 + \eta^n O - \eta Q_0 - \eta O = \sum_{i=2}^{n} \eta^i Q_0 + \eta^n O - \eta O$$

The charge quantity corresponding to the gray values of n images is multiplyed with the corresponding correction coefficient to obtain the charge quantity of n corrected images corresponding to the gray values:

$$P_i = (q_i - q_1) * m_i;$$

wherein, $P_i$ is the charge quantity corresponding to the gray values of the i-th frame image after correction, and $m_i$ is the correction coefficient corresponding to the i-th frame image. In actual shooting, the image of n frames obtained by subtracting the first frame as offset is calculated based on the image gray value, and the image gray value is multiplied by the corresponding correction coefficient to realize the correction of the image. The gray value of the image corresponds one-to-one to the integrating capacitor, as shown in the following equation:

$$g_i = k \cdot (q_i - q_1);$$

wherein, $g_i$ is the gray value of the i-th frame image after subtracting the first frame image, and k is the scaling coefficient. Multiply the gray value of the i-th frame image with the corresponding correction coefficient, and the corrected gray value $G_i$ of the i-th frame image is represented as:

$$G_i = k \cdot (q_i - q_1) \cdot m_i;$$

the correction of the i-th frame image is completed.

Specifically, the initial power of the capacitor O should be a very small number close to zero. For the convenience of estimation, O is considered to be equal to zero. In the ideal case, it should be $q_i = iQ_0$, $q_i - q_1 = (i-1)Q_0$. The correction coefficient sequence is thus determined based on the integrating capacitor $C_1$, the sampling capacitor $C_2$, and the sampling sequence.

The correction coefficient sequence is expressed as:

$$M = \{m_1, m_2, \ldots, m_n\};$$

$$m_i = \frac{i-1}{\sum_{j=2}^{i} \eta^j};$$

wherein, M is the correction coefficient sequence; $m_i$ is the correction coefficient corresponding to the ith frame image; i is the sampling sequence, i∈(1, . . . , n) j∈(2, . . . , i); n is the total number of sampling times; η is the charge retention rate of the integrating capacitor, $$\eta = \frac{c_1}{c_1 + c_2} (\eta < 1);$$

wherein, $C_1$ is the capacitance of the integrating capacitor and $C_2$ is the capacitance of the sampling capacitor. For i=1, $m_1$=0.

In a specific embodiment of the present disclosure, the correction coefficient sequence may be obtained in real time according to the integrating capacitor, the sampling capacitor and the sampling sequence, or may be stored in the detector in advance, for example, for a certain camera, a correction coefficient sequence consisting of one correction coefficient may be determined in advance and stored in the camera, and if n frames of images are read out by multiple integrations, the first n correction factors (l≥n) are used directly.

Specifically, the line fitting on the corrected n images is performed through the FPGA to obtain the algorithm output values for each pixel of the processed images, which includes:

the gray values of all the pixels in the r-th row and the c-th column in the n images are taken as a group of data sequences; each image has r*c groups of data sequences to be processed in total;

an algorithm output value corresponding to each pixel respectively is determined according to the data sequence corresponding to each pixel position:

$$V(r, c) = \sum_{i=1}^{n} \frac{12 y_i(r, c)(i - (n+1)/2)}{n(n+1)};$$

wherein, V(r,c) is the algorithm output value corresponding to the pixel in the r-th row and the c-th column, $y_i$(r,c) is the gray value corresponding to the data numbered i in the data sequence corresponding to the pixel in the r-th row and the c-th column, both r and c are integers, and r and c respectively are the row number and the column number of the pixel, n is the total number of images participating in the calculation, and i is the sampling order, that is, the i-th frame image in the order of acquisition.

Specifically, according to the data sequence corresponding to each pixel position, the algorithm output value corresponding to each pixel is respectively determined, and after traversing the data sequences corresponding to all pixels, the processing work is completed and output to the image receiving system, which may be an image acquisition card or a computer. According to the data sequence corresponding to each pixel position, n data in the data sequence corresponding to the pixel at the r-th row and the c-th column are numbered from 1 according to the sampling sequence, and an algorithm output value V(r,c) corresponding to the pixel in the r-th row and the c-th column is determined and output by using data points in the data sequence. The output value is n times of a single increment obtained by linear fitting of n data points, and the physical meaning is similar to the difference between the gray value of the n-th image and the gray value of the first image.

The embodiment of the present disclosure corrects the influence of the actual sampling process on the integrating capacitor power by introducing correction coefficients, reduces system errors, and improves the measurement accuracy of the target source under long integrating time. Assuming that the noise contained in each sampling value is independent of each other as σ, and the standard deviation of the correlated double sampling method is $$\sigma_V = \sqrt{\frac{6(n-1)}{n(n+1)}} \, \sigma_{CDS};$$

so the relationship between the slope sampling and the correlated double sampling method can be obtained as follows:

$$\sigma_{CDS} = \sqrt{2} \, \sigma,$$

the readout noise can be effectively reduced with the increase of the sampling times.

Figure 3:
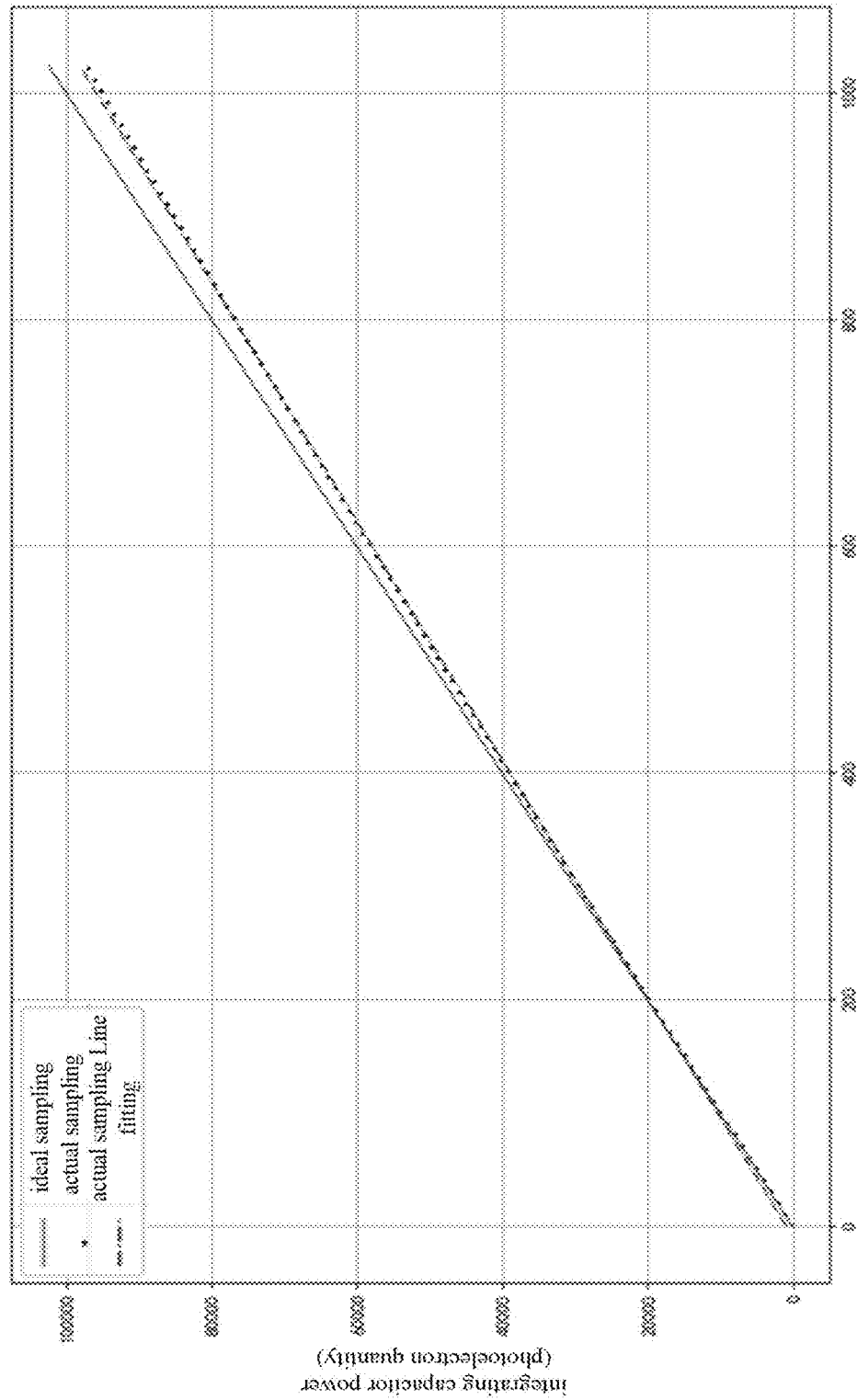
FIG. 3 is a schematic diagram of the influence of the actual sampling process on the sampling result according to an embodiment of the present disclosure.
Figure 4:
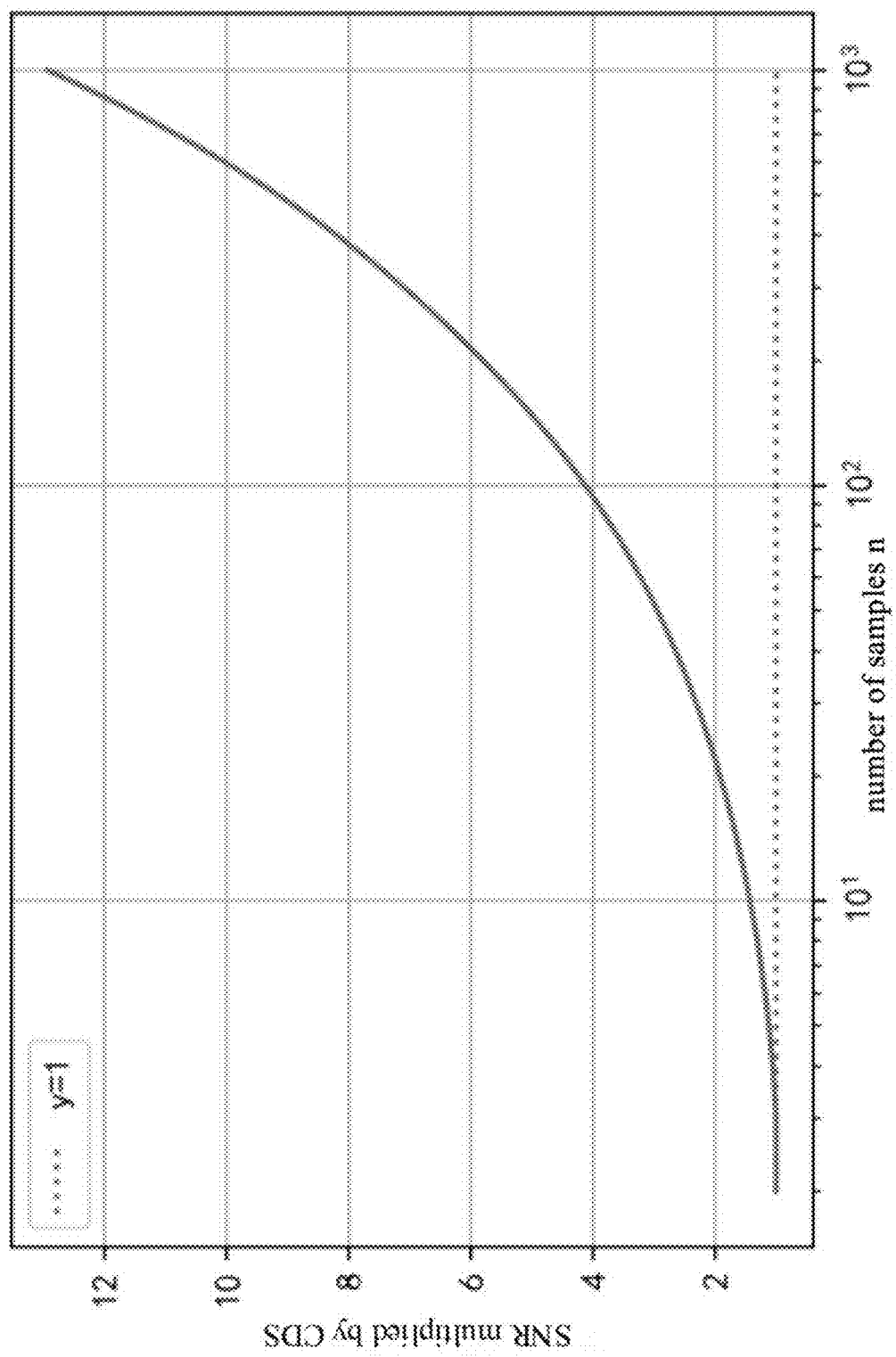
FIG. 4 is a schematic diagram illustrating the optimization of the signal-to-noise ratio of the corrected ramp sampling to the correlated double sampling under the long integrating time according to an embodiment of the present disclosure.

The sampling method of the embodiment of the present disclosure is analyzed by using python, as shown in FIG. 3 and FIG. 4. FIG. 3 includes the sampling results of the ideal case (that is, the influence of the sampling capacitor on the integrating capacitor is not considered) and the actual case when the ratio of the integrating capacitor to the sampling capacitor is assumed to be a 10000 and the noise is not considered. It can be seen that as the number of sampling increases, the system error caused by the influence of the actual sampling process on the integral capacitor power becomes larger and larger. There is a deviation between the actual sampling and the ideal sampling; although they are all straight lines visually in FIG. 3, the scatter pattern of the actual sampling is closer and closer to the logarithmic function as the number of sampling increases. According to the embodiment of the disclosure, the obtained correction coefficient is multiplied by the actual sampling value to realize correction, so that the nonlinear problem of the actual sampling process is solved. FIG. 4 shows that as the number of sampling points increases, the signal-to-noise ratio of the output result is continuously improved compared with the signal-to-noise ratio of the correlated double sampling, and when the number of sampling points is 20, the signal-to-noise ratio using the embodiment of the present disclosure is twice that using the correlated double sampling.

The present embodiment also discloses a method for optimizing sampling of short-wave infrared detector, as shown in the FIG. 1, including:
  a short-wave infrared detector, which is configured to enable the multiple integrating readout function of the short-wave infrared detector;
  a multiple integrating readout camera, which is configured to perform n integrating imaging on a target region;
  an integrating imaging processing module, which is configured to subtract a first frame image from all images to obtain n images within one integrating period;
  a correction coefficient sequence determination module, which is configured to determine the correction coefficient sequence based on the integrating capacitor, the sampling capacitor, and the sampling sequence; and
  an image correction module, which is configured to carry out multiplication correction respectively on the n images in sequence according to a one-to-one correspondence mode of the sampling sequence of the n images and the correction coefficient sequence order of the n images to obtain n corrected images.

Specifically, the system also includes a result output module, configured to perform line fitting on the corrected n images to obtain the algorithm output values for each pixel of the processed images as the image sampling results.

Various embodiments of the present specification are described in a progressive manner, and each embodiment focuses on the description that is different from the other embodiments, and the same or similar parts between the various embodiments are referred to with each other. For the device disclosed in the embodiment, since it corresponds to the method disclosed in the embodiment, the description is relatively simple, and the correlation is described with reference to the method part.

The above description of the disclosed embodiments enables those skilled in the art to implement or use the present disclosure. Various amendments to the embodiments will be apparent to those skilled in the art. The general principles defined herein may be implemented in other embodiments without departing from the spirit or scope of the disclosure. Therefore, the present disclosure will not be limited to the embodiments shown herein but is to be accorded the widest scope consistent with the principles and novel features disclosed herein.

The invention claimed is:

1. A method for optimizing sampling of a short-wave infrared detector, comprising:
  enabling a multiple integrating readout function of the short-wave infrared detector;
  performing n integrating imaging on a target region by using a multiple integrating readout camera, subtracting a first frame image from all images to obtain n images within one integrating period;
  determining a correction coefficient sequence based on an integrating capacitor, a sampling capacitor, and a sampling sequence;
  carrying out a multiplication correction respectively on the n images in sequence according to a one-to-one correspondence mode of the sampling sequence of the n images and a correction coefficient sequence order of the n images to obtain n corrected images;

setting power of the integrating capacitor after each sampling to $q_i$ obtain integrating capacitor power after each sampling is as:

$$q_0 = O$$
$$q_1 = \eta(Q_0 + O) = \eta Q_0 + \eta O$$
$$q_2 = \eta(\eta(Q_0 + O) + Q_0) = \eta^2 Q_0 + \eta Q_0 + \eta^2 O$$
$$\vdots$$
$$q_n(q_{n-1} + Q_0)\eta = \sum_{i=1}^{n} \eta^i Q_0 + \eta^n O$$

wherein, $q_n$ is power after n times of sampling, i is a sampling sequence, $i \in (1, \ldots, i)$, O is initial power of the integrating capacitor, $Q_0$ is an integrating photoelectron increment in a sampling interval, and $\eta$ is a charge retention rate of the integrating capacitor, $$\eta = \frac{c_1}{c_1 + c_2}(\eta < 1);$$

wherein $C_1$ is a capacitance of the integrating capacitor and $C_2$ is a capacitance of the sampling capacitor;

subtracting an integrating capacitor power $q_1$ after the first sampling from the integrating capacitor power $q_i$ after the sampling to obtain charge quantity of corresponding gray values of the n images in one integrating period, comprising:

$$q_1 - q_1 = 0$$
$$q_2 - q_1 = \eta^2 Q_0 + \eta^2 O - \eta O$$
$$\vdots$$
$$q_n - q_1 = \sum_{i=1}^{n} \eta^i Q_0 + \eta^n O - \eta Q_0 - \eta O = \sum_{i=2}^{n} \eta^i Q_0 + \eta^n O - \eta O$$

multiplying the charge quantity corresponding to the gray values of the n images with the corresponding correction coefficient to obtain a charge quantity of the n corrected images corresponding to the gray values:

$$P_i = (q_i - q_1) * m_i;$$

wherein $P_i$ is a charge quantity corresponding to gray values of an i-th frame image after correction, and $m_i$ is a correction coefficient corresponding to the i-th frame image; the gray value of the image corresponds one-to-one to the integrating capacitor, as shown in a following equation:

$$g_i = k \cdot (q_i - q_1);$$

wherein $g_i$ is a gray value of the i-th frame image after subtracting the first frame image, and k is a scaling coefficient;

multiplying the gray value of the i-th frame image with the corresponding correction coefficient, and a corrected gray value $G_i$ of the i-th frame image is represented as:

$$G_i = k \cdot (q_i - q_1) \cdot m_i;$$

completing a correction of the i-th frame image;
the correction coefficient sequence is:

$$M = \{m_1, m_2, \ldots, m_n\};$$

$$m_i = \frac{i-1}{\sum_{j=2}^{i} \eta^j};$$

wherein M is the correction coefficient sequence; i∈(1, ..., n), j∈(2, ..., i), n is a total number of sampling times.

2. The method for optimizing sampling of short-wave infrared detector according to claim 1, further comprising: performing line fitting on the n corrected images to obtain algorithm output values for each pixel of processed images as image sampling results.

3. The method for optimizing sampling of short-wave infrared detector according to claim 2, wherein the step of performing line fitting on the n corrected images to obtain the algorithm output values for each pixel of the processed images comprises:

taking gray values of all pixels in a r-th row and a c-th column in the n images as a group of data sequences;
determining the algorithm output value corresponding to each pixel respectively according to the data sequence corresponding to each pixel position:

$$V(r, c) = \sum_{i=1}^{n} \frac{12 y_i(r, c)(i - (n+1)/2)}{n(n+1)};$$

wherein V(r,c) is the algorithm output value corresponding to the pixel in the r-th row and the c-th column, $y_i(r,c)$ is the gray value corresponding to the data numbered i in the data sequence corresponding to the pixel in the r-th row and the c-th column, both r and c are integers, and r and c respectively are a row number and a column number of the pixel, n is a total number of images participating in calculation, and i is a sampling order.

4. A system for optimizing sampling of a short-wave infrared detector applied to the method for optimizing sampling of the short-wave infrared detector according to claim 1, comprising:

the short-wave infrared detector, configured to enable the multiple integrating readout function of the short-wave infrared detector;

the multiple integrating readout camera, configured to perform n integrating imaging on the target region;
an integrating imaging processing module, configured to subtract the first frame image from all images to obtain n images within one integrating period;
a correction coefficient sequence determination module, configured to determine the correction coefficient sequence based on the integrating capacitor, the sampling capacitor, and the sampling sequence; and
an image correction module, configured to carry out multiplication correction respectively on the n images in sequence according to the one-to-one correspondence mode of the sampling sequence of the n images and the correction coefficient sequence order of the n images to obtain the n corrected images.

5. The system for optimizing sampling of short-wave infrared detector according to claim 4, further comprising: a result output module, configured to perform line fitting on the n corrected images to obtain algorithm output values for each pixel of processed images as image sampling results.

6. The system for optimizing sampling of short-wave infrared detector according to claim 4, wherein the method further comprises: performing line fitting on the n corrected images to obtain algorithm output values for each pixel of processed images as image sampling results.

7. The system for optimizing sampling of short-wave infrared detector according to claim 6, wherein the step of performing line fitting on the n corrected images to obtain the algorithm output values for each pixel of processed images comprises:

taking gray values of all pixels in a r-th row and a c-th column in the n images as a group of data sequences;
determining the algorithm output value corresponding to each pixel respectively according to the data sequence corresponding to each pixel position:

$$V(r, c) = \sum_{i=1}^{n} \frac{12 y_i(r, c)(i - (n+1)/2)}{n(n+1)};$$

wherein V(r,c) is the algorithm output value corresponding to the pixel in the r-th row and the c-th column, $y_i(r,c)$ is the gray value corresponding to the data numbered i in the data sequence corresponding to the pixel in the r-th row and the c-th column, both r and c are integers, and r and c respectively are a row number and a column number of the pixel, n is a total number of images participating in calculation, and i is a sampling order.

* * * * *